United States Patent [19]
Wood

[11] Patent Number: 5,805,433
[45] Date of Patent: Sep. 8, 1998

[54] SMALL OFFLINE POWER SUPPLY

[75] Inventor: Peter N. Wood, Rolling Hills Estates, Calif.

[73] Assignee: International Rectifier Corporation, El Segundo, Calif.

[21] Appl. No.: 842,713

[22] Filed: Apr. 16, 1997

Related U.S. Application Data

[60] Provisional application No. 60/015,569 Apr. 18, 1996.

[51] Int. Cl.[6] .................................................. H02M 3/337
[52] U.S. Cl. ................................. 363/16; 363/17; 363/98
[58] Field of Search .................................. 363/15–17, 95, 363/97, 98, 131, 132

[56] References Cited

U.S. PATENT DOCUMENTS

| | | | |
|---|---|---|---|
| 4,506,318 | 3/1985 | Nilssen | 363/132 |
| 4,729,081 | 3/1988 | Nilssen | 363/17 |
| 4,939,427 | 7/1990 | Nilssen | 315/209 R |
| 4,947,309 | 8/1990 | Jonsson | 363/17 |
| 5,039,919 | 8/1991 | Nilssen | 315/209 R |
| 5,083,255 | 1/1992 | Nilssen | 363/132 |
| 5,180,950 | 1/1993 | Nilssen | 315/127 |
| 5,229,927 | 7/1993 | Vila-Masot et al. | 363/23 |
| 5,303,137 | 4/1994 | Peterson | 363/16 |
| 5,666,280 | 9/1997 | Janaswamy et al. | 363/98 |

*Primary Examiner*—Adolf Berhane
*Attorney, Agent, or Firm*—Ostrolenk, Faber, Gerb & Soffen, LLP

[57] ABSTRACT

A power supply includes a half bridge transistor circuit coupled across a DC bus, where the half bridge transistor circuit includes a high-side transistor and a low-side transistor and produces an output pulse width modulation (PWM) signal and a self oscillating half bridge driver circuit for producing first and second control PWM signals in response to an external threshold signal. The first control PWM signal is coupled to a control terminal of the high-side transistor and the second control PWM signal is coupled to a control terminal of the low-side transistor. The power supply also includes a low pass filter for receiving the output PWM signal and producing a DC output voltage therefrom across a pair of output terminals and a programmable voltage regulating device having an input terminal coupled to the DC output voltage and an output terminal coupled to the external threshold voltage.

33 Claims, 6 Drawing Sheets

SMALL OFFLINE POWER SUPPLY

CROSS REFERENCE TO RELATED APPLICATION

This application is based on and claims priority to U.S. Provisional patent application Ser. No. 60/015,569, filed Apr. 18, 1996, entitled SMALL OFFLINE POWER SUPPLY. This application is related to U.S. patent application Ser. No. 08/713,729, filed Sep. 13, 1996, entitled MOS GATE DRIVER CIRCUIT WITH ANALOG INPUT AND VARIABLE DEAD TIME BAND.

BACKGROUND OF THE INVENTION

1. Field of the Invention

This invention relates to power supplies and, more specifically, to small, voltage and/or current regulated power supplies which work off line, for example, directly from the line voltage of a home or office.

2. Related Art

In many power conditioning applications (including DC—DC converters, motor drives and large power supplies) there is a need for a small auxiliary power supply, a so-called "bias power supply," to furnish housekeeping power. The bias power supply sources power to the control circuitry, protection circuitry and other circuits such as indicator lamps and the like.

The simplest example of an off-line bias power supply is a small transformer and rectifier connected to an AC input line. When there is no AC input line, then some form of DC—DC converter must be employed.

The type 51Hxxx line of integrated circuits (for example the IR 51H737) manufactured by the International Rectifier Corporation of El Segundo, Calif., consists of a series of self-oscillating hybrid devices which are ideal for these small bias power supplies because they provide a complete conversion function in a single in-line miniature package. Thus, all that is required to complete the design is a small isolation transformer and a few diodes.

FIG. 1 shows the basic schematic for a known bias converter which drives high-side and low-side power MOSFETs 1 and 2, respectively. The bias converter can supply up to about 25 watts of power into the transformer primary winding 10 of transformer 10a. The frequency of operation (the switching frequency) can be determined from the following equation:

$$f=1/(1.4 \cdot (Rt+75\Omega) \cdot Ct)$$

Reference is now made to FIG. 2 which illustrates an example of how the converter of FIG. 1 could be implemented using the IR 51H737 integrated circuit driver chip with the following parameters:

Frequency: 50 Khz;

Output power: 25 watts (max);

Input AC: 120 Volts, 60 Hz;

DC bus voltage: 160 VDC;

Transformer primary: 80 V RMS; and

DC outputs 5 V @3 A and 12 V @0.5 A approx.

A transformer 30 operating at 50 Khz and supplying 25 watts can be designed using a ferrite core with an effective area of about 40 mm² and a flux density of 100 mT. From Faraday's equation, V=4B·A·f·N, the actual flux density at 1 turn per volt can be calculated as follows:

$$B = \frac{1}{4 \cdot Ae \cdot f}$$

where f=50 Khz and Ae is around 40 mm² and $$B = \frac{10^6}{4 \cdot 40 \cdot 50} = 125 \, mT \text{ (which is acceptable)}.$$

A suitable transformer core to meet the above requirements is a No. PC 30 EE22-Z which has an effective area of 41 mm². The PC 30 material has a saturation flux density of 390 mT @100° C. so core losses are minimal. The matching bobbin No. BE 22 118CP is wound with a primary winding 20 of 80 turns of 30 HAPT magnet wire and a secondary winding of 6 turns of 22 HAPT in a bifilar configuration. The two transformer secondary windings 21 and 22 are joined together (at terminals "RET") to form a center tapped winding which drives common cathode Schottky rectifiers and filter capacitors.

While the circuit of FIG. 2 may be used as a bias supply in some circumstances, it is often necessary to provide regulation for line and load variations and, therefore, some form of closed loop feedback is desirable. Although, a secondary series pass regulator could be used, such as the three terminal 7812 regulator shown, the efficiency of such series pass regulators is poor and, therefore, undesirable.

The prior art bias supply of FIG. 2 has several other disadvantages. Specifically, the output diodes (even when Schottky diodes are used), having relatively large forward drops and exhibit reverse recovery currents at each switching cycle. Consequently, efficiency is reduced and the supply can only source current, not sink current. In addition, when multiple outputs are employed, for example, the +5 V and +12 V outputs shown, the regulated output must be loaded (i.e., sourcing current) in order to maintain regulation of all outputs.

Accordingly, there is a need in the art for a relatively small, cost effective, efficient, and closed loop regulated bias supply which can sink or source current.

SUMMARY OF THE INVENTION

In order to overcome the disadvantages of the prior art bias supplies, the power supply of the present invention includes a half bridge transistor circuit coupled across a DC bus, where the half bridge transistor circuit includes a high-side transistor and a low-side transistor and produces an output pulse width modulation (PWM) signal.

The power supply of the present invention also includes a self oscillating half bridge driver circuit for producing first and second control PWM signals in response to an external threshold signal. The first control PWM signal is coupled to a control terminal of the high-side transistor and the second control PWM signal is coupled to a control terminal of the low-side transistor.

Also included in the power supply is a low pass filter for receiving the output PWM signal and producing a DC output voltage therefrom across a pair of output terminals and a programmable voltage regulating device having an input terminal coupled to the DC output voltage and an output terminal coupled to the external threshold voltage.

Other features and advantages of the present invention will become apparent from the following description of the invention which refers to the accompanying drawings.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

DETAILED DESCRIPTION OF THE DRAWINGS

Figure 1:
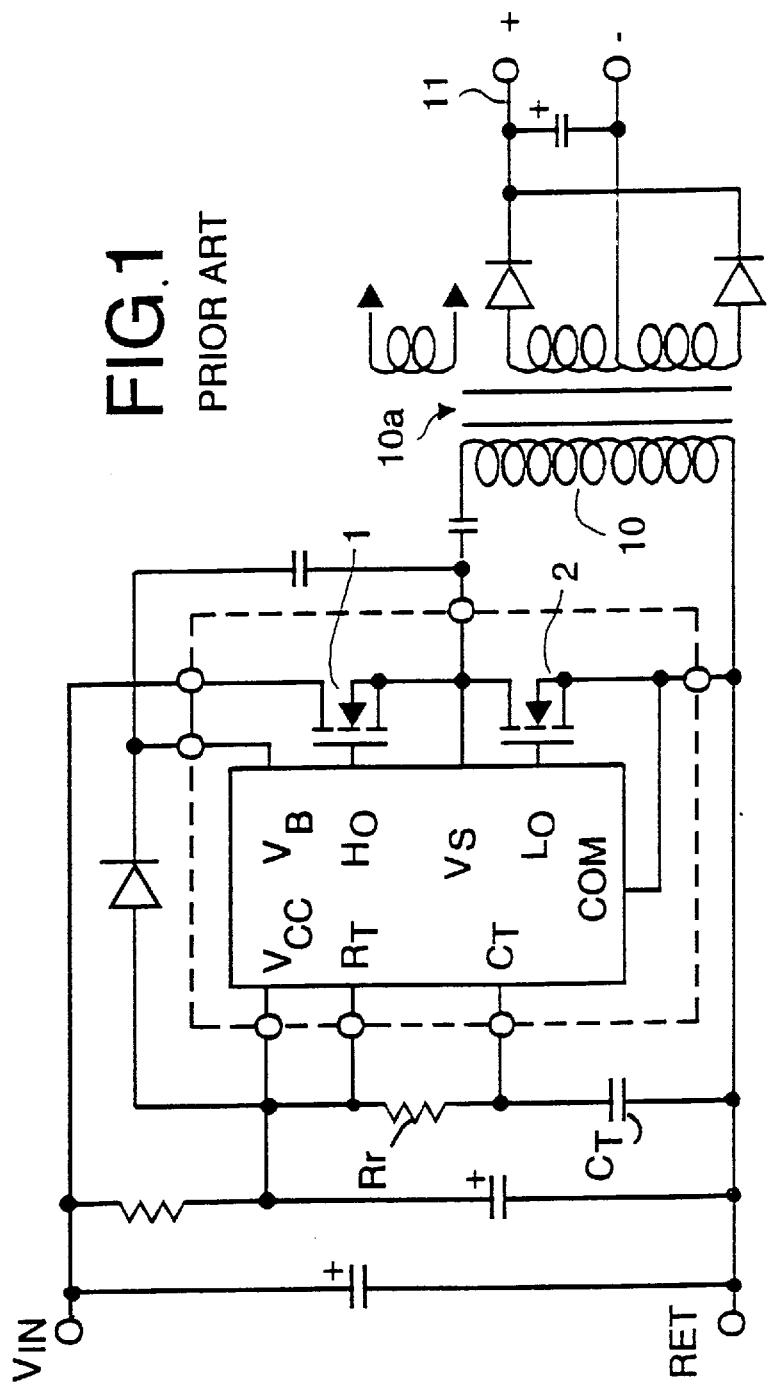
FIG. 1 shows a prior art off-line power converter circuit.
Figure 2:
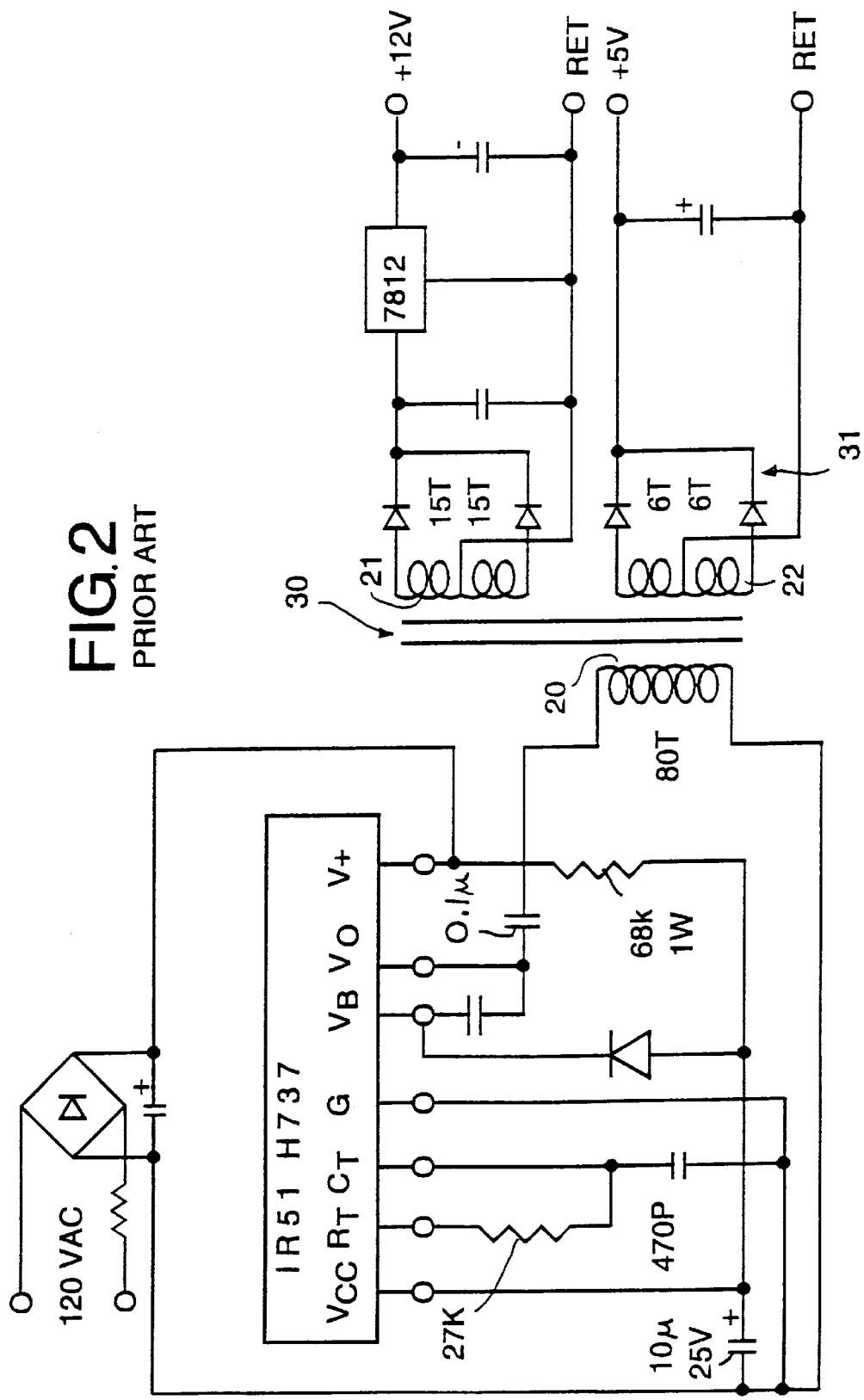
FIG. 2 shows the circuit of FIG. 1 for a prior art off-line power supply with unregulated and isolated outputs.
Figure 3:
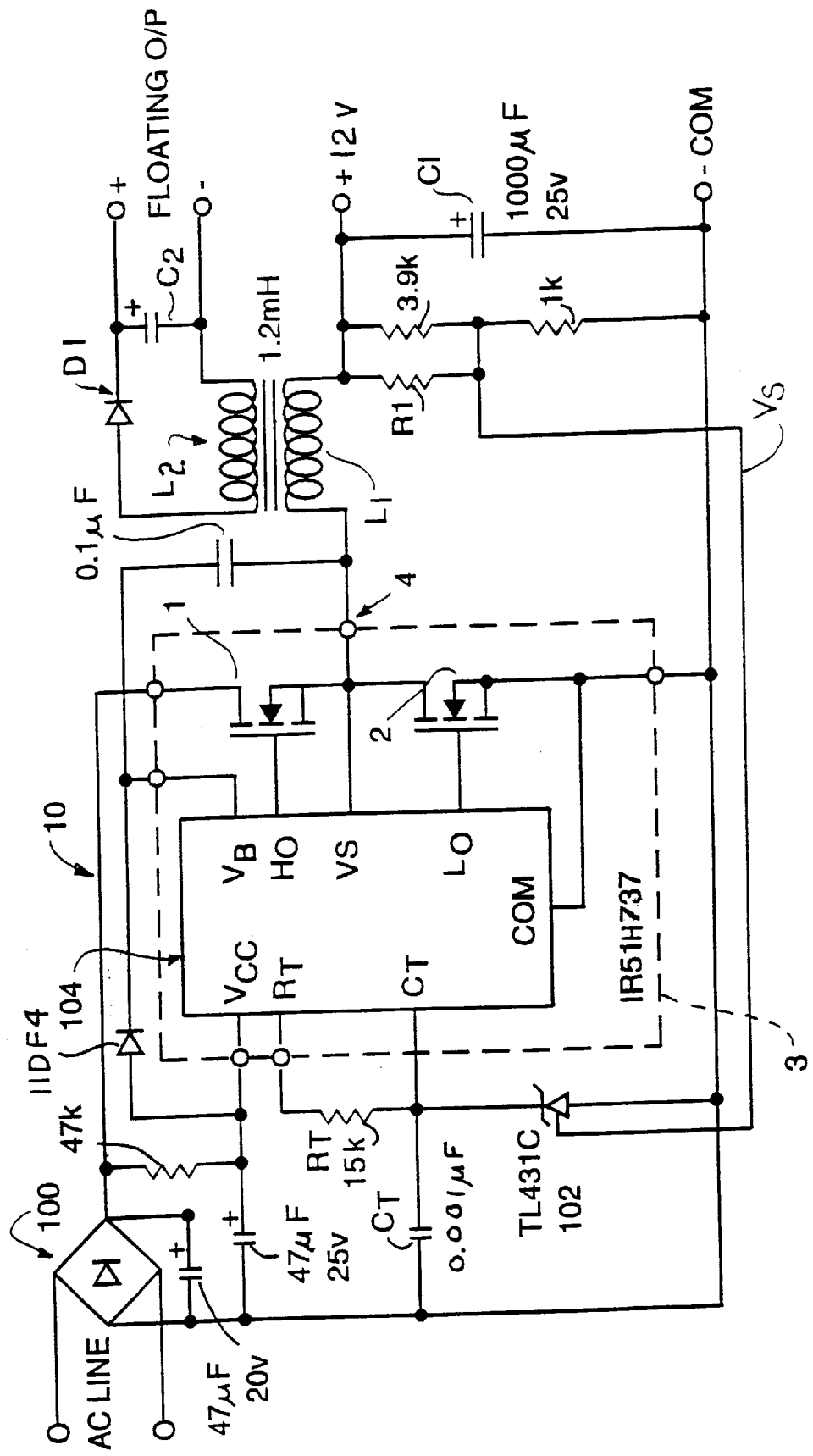
FIG. 3 shows an off-line power converter circuit which employs closed loop voltage regulation in accordance with the invention.

Referring now to the drawings wherein like numerals indicate like elements, there is shown in FIG. 3 an off-line power converter circuit 10 in accordance with one embodiment of the present invention. The circuit 10 includes a full wave bridge rectifier circuit 100 (which is preferably implemented using four 1N4004 diodes) coupled to a smoothing capacitor. The output of the bridge rectifier 100 is filtered by way of an RC circuit (preferably a 47K resistor and 47 μF capacitor) which feeds the $V_{CC}$ terminal of integrated circuit 3.

The integrated circuit 3 (for example, the IR51H737 device discussed above) comprises a low cost self-oscillating driver 104 (for example, an IR2151) and two power MOSFETs 1 and 2. The driver 104 produces low power, control pulse width modulated (PWM) signals (Ho and Lo) which are coupled to the control terminals of the high-side and low-side MOSFETs 1 and 2. It is noted that transistors (other than the MOSFETs shown) may be used in the half bridge, for example, IGBTs or bipolar transistors.

The control PWM signals (Ho and Lo) alternately bias MOSFETs 1 and 2 on and off in accordance with the charge and discharge characteristics of an external threshold signal on the $C_T$ pin relative to an internally generated reference voltage. More specifically, when the voltage on the Ct pin is rising, MOSFET 1 is off and MOSFET 2 is on. Conversely, when the voltage on the $C_T$ pin is falling, MOSFET 1 is on and MOSFET 2 is off.

A bootstrap circuit (preferably a 11DF4 diode and 0.01 μF capacitor) provide an elevated voltage potential for turning on MOSFET 1.

In response to the Ho and Lo outputs of the driver 104, the MOSFETs 1, 2 produce a high power, output pulse width modulated (PWM) signal at the output of the half bridge 4. This output is coupled to a low pass filter, formed by L1 and C1, which provides an averaged DC voltage of the output PWM signal 4 between the +12 V and −COM terminals. A floating output may be obtained by providing a secondary winding L2 which is linked to inductor L1 such that (via transformer action) rectifier D1 may provide a DC floating output voltage across C2.

Regulation of the power converter circuit 10 is accomplished using a feedback loop which manipulates the PWM duty cycle of the driver 104. Specifically, a sensed voltage $V_S$ (a fraction of the DC output voltage across C1) is obtained via a resistor divider circuit (preferably formed by an upper 3.9K resistor, with trim resistor R1 in parallel therewith, and a lower 1K resistor). The $V_S$ signal is coupled to the input of a three terminal shunt regulator 102 (preferably a TL431C, which may be integrated into IC 3) where the common terminal thereof is coupled to −COM and the output terminal is coupled to the $C_T$ terminal of driver 104.

The shunt regulator 102 operates to change the duty cycle of the self-oscillating driver 104 in response to line and load changes. The shunt regulator 102 operates as a "programmable zener diode" because the terminal voltage of the regulator 102 adjusts in accordance with its input voltage. The present invention utilizes the programmability of the shunt regulator 102 to close the feedback loop of the power converter circuit 10.

More specifically, if the AC line voltage were to rise, the +12 V output terminal would tend to increase relative to the −COM terminal and, therefore, $V_S$ would likewise increase. Consequently, the shunt regulator 102 would tend to decrease its terminal voltage (i.e., sink current from the $C_T$ terminal of driver 104) and slow the rate at which the voltage at the $C_T$ terminal rises. Therefore, the OFF-time of the MOSFET 1 would increase and the output voltage would move in a corrective manner back toward the ideal regulated value (in this case, 12 volts). An opposite sequence would occur when the line voltage decreases.

The ON-time of the MOSFET 1 is constant (set via Rt and Ct) and, therefore, the power converter circuit 10 is a constant on-time, variable frequency PWM supply.

Advantageously, the use of a half bridge configuration (MOSFETs 1 and 2) allows for active commutation of the PWM signal. Consequently, higher efficiency is attained because the relatively high forward voltage drops of rectifier diodes are replaced by the channel drops of the commutation MOSFETs 1 and 2. Indeed, the forward voltage drops of the MOSFETs may be as low as tens of mV versus the forward voltage drop of a rectifier diode (typically 0.6 volts or more). Further, the MOSFETs do not suffer from reverse recovery time power losses (as do rectifier diodes) and, therefore, additional conversion efficiency is obtained.

An additional advantage of the power converter circuit 10 of the present invention is that the output voltage can remain in regulation regardless of whether it is sourcing or sinking load current. This feature is particularly useful for multiple output regulators as in FIG. 3 because it allows power to be drawn from the unregulated outputs (i.e., the floating output) without having to load the regulated output (one of the major problems with diode commutated buck regulators of the prior art).

Further, the use of the IR51HXXX series of conversion circuits provides for regulation over very large dynamic ranges, for example, the input DC voltage may vary from about 30 V to 500 VDC depending on the 51HXXX device selected.

Figure 4:
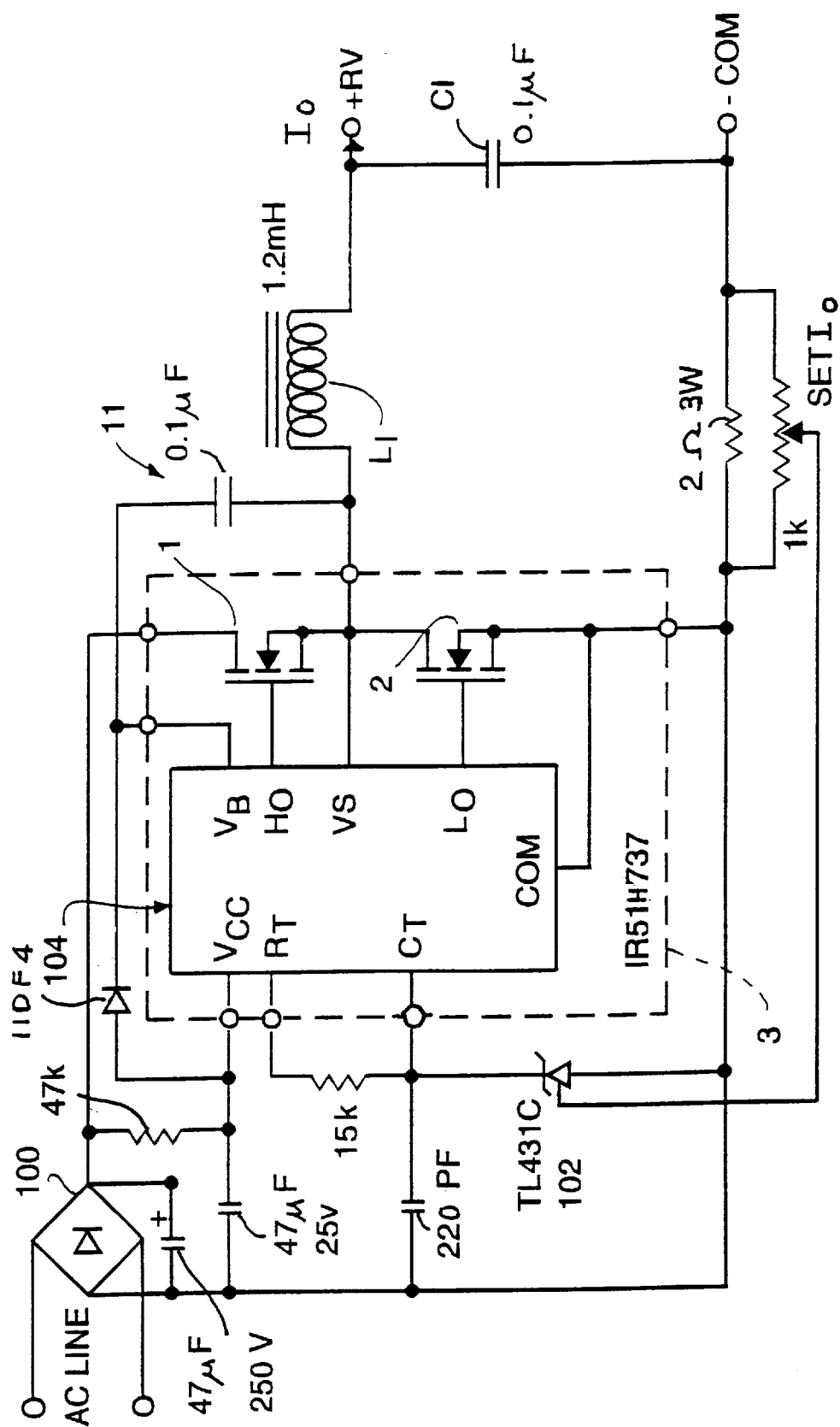
FIG. 4 shows an off-line power converter circuit which employs a current regulator for a battery charging application in accordance with the present invention.

Reference is now made to FIG. 4 which shows another embodiment of the present invention. The power converter circuit 11 of FIG. 4 is a modification of the circuit of FIG. 3 where a specific output current $I_O$ is in closed loop regulation to provide, for example, a battery charger function. The circuit 11 of FIG. 4 is similar to the circuit 10 of FIG. 3 except that, instead of using a voltage feedback signal $V_S$, the current $I_O$ is sensed. Specifically, a shunt resistor (preferably a 2 Ω, 3 W, current shunt resistor) is used to convert the current, $I_O$, into a sensed voltage which is trimmed via a potentiometer (preferably a 1K potentiometer) and input to the shunt regulator 102.

Advantageously, the circuit 11 of FIG. 4 provides a constant current output up to 50% of the output voltage (V+)

and the synchronous commutation of the MOSFETs 1 and 2 prevents peak charging of V+ when the load is removed.

Figure 5:
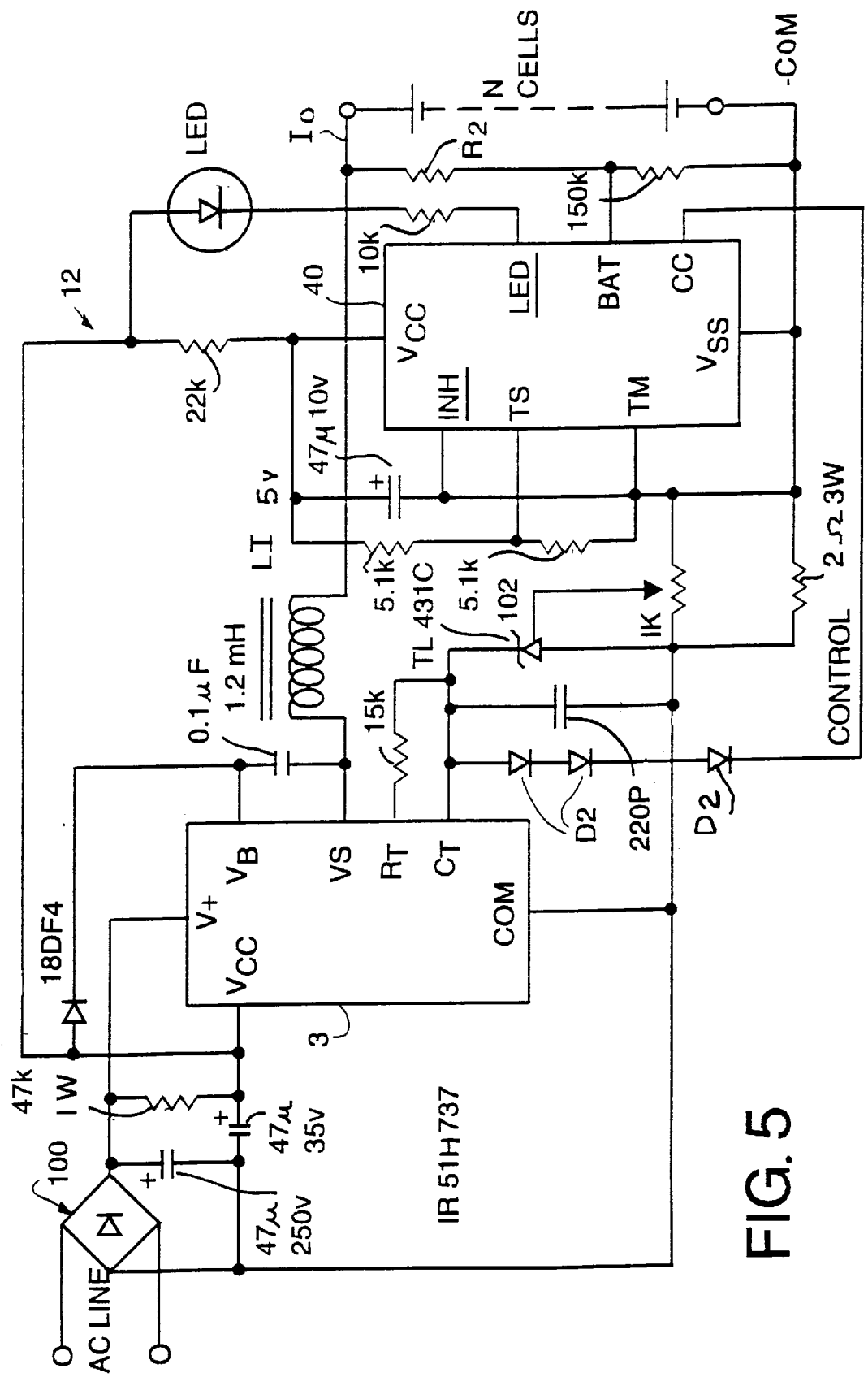
FIG. 5 shows an off-line power converter circuit with current regulation for rapid charging a battery in accordance with the present invention.

Reference is now made to FIG. 5 which shows the circuit of FIG. 4 with additional details for providing a rapid charger circuit 12 for charging, for example, lap top computer NiCad or NiMH batteries. This charger terminates a charge cycle by sensing battery temperature, peak voltage, and/or slope cutoff. These functions are accomplished by adding a low cost battery management control IC 40 (for example, the BENCHMARQ bq 2002) to the current regulated power converter 11 of FIG. 4.

In particular, a 5 V supply is provided to the $V_{CC}$ terminal of IC 40 via a resistor divider circuit (preferably comprising a 22K resistor and two 5.1K resistors). A suitable reference voltage is provided to the $V_S$ terminal of IC 40. The circuit is configured for peak voltage termination (PVT) by connecting the timer mode ($T_M$) pin to ground and sensing the voltage across N battery cells via a resistor divider circuit consisting of an upper resistor R2 and a lower resistor (preferably a 150K resistor). R2 is thus selected such that R2=150K·(N−1).

The IC 40 controls the constant current charger by means of an internally generated control signal at pin $C_C$ which is coupled to the $C_T$ terminal of the converter IC 3 through a level shifting circuit D2. It is noted that the level shifting circuit is shown as series coupled diodes D2, which are preferably 1N914 diodes; however, any known level shifting circuit may be employed, such as a zener diode. The control signal is of the on-off type and, by duty cycle modulation of this signal, the complete battery management process can be achieved.

A suitable charging cycle for both Nicad or NiMH batteries is as follows: rapid charging until PVT followed by a top off charge and then a trickle charge period.

Rapid charging is initiated when at least one battery is connected to the charger output terminals $I_O$ and −COM (provided that the battery temperature and voltage are within pre-determined limits as determined by the control chip).

At the termination of rapid charge, the control signal is modulated at about 286 μs ON and about 4.6 ms OFF to supply a top off charge for a pre-determined timed period. More particularly, when the control signal at $C_C$ is ON, the $C_T$ pin of IC 3 is permitted to oscillate at a rate and level which permits current to rise in L1 and deliver some current to the battery. When the control signal at $C_C$ is OFF, however, the $C_T$ pin of IC 3 is pulled sufficiently low to prevent current from rising in L1.

Later, the duty cycle changes to about 286 μs ON and about 18.3 ms OFF for providing a trickle charge to the battery.

Figure 6:
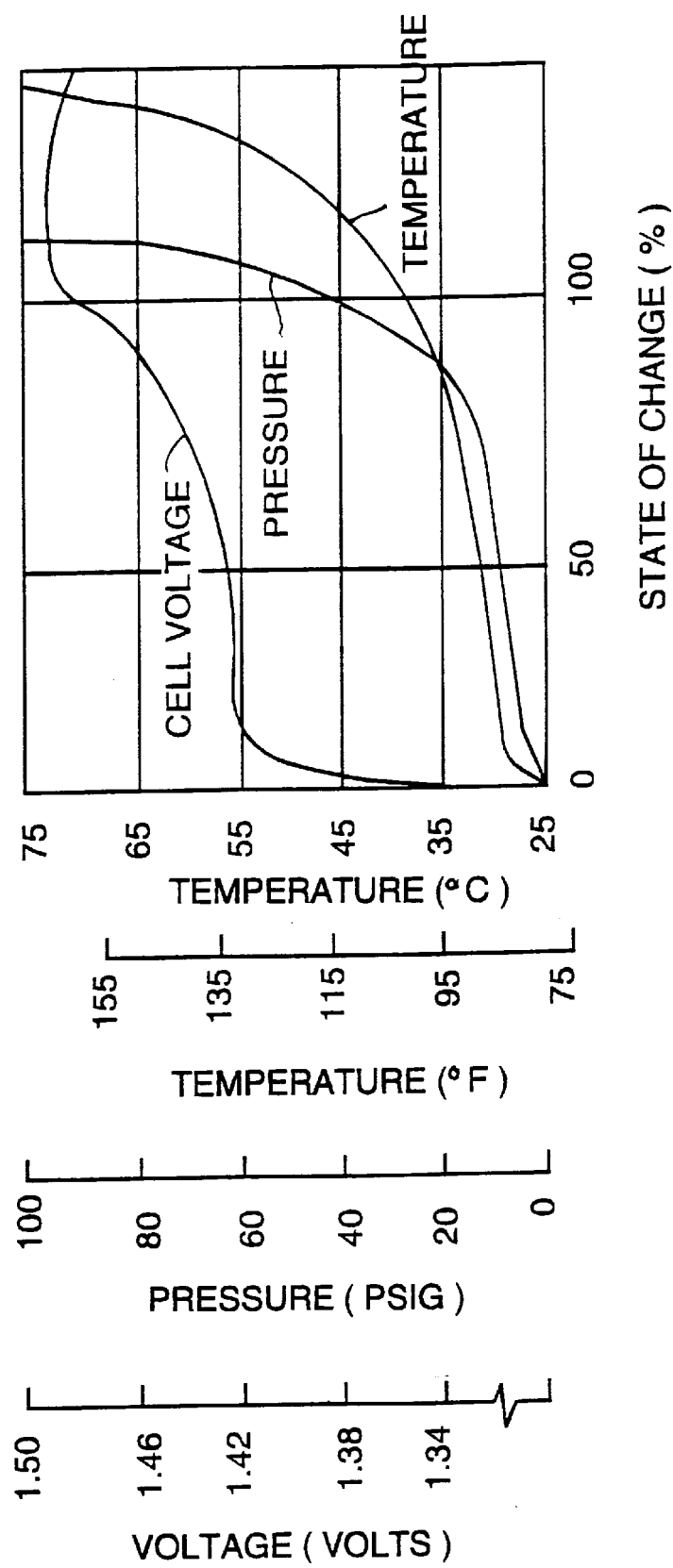
FIG. 6 shows a typical battery charge characteristic, when using the circuit of FIG. 5.

FIG. 6 shows a typical battery voltage versus time characteristic using the battery management scheme of the present invention. More specifically, FIG. 6 shows the characteristics of voltage, pressure and temperature versus state of charge of a Nicad cell at a 1C rate.

Note that the cell voltage rises rapidly as fast charging is initiated, then progresses more slowly until full charge is reached. The cell voltage finally peaks at around 1.48 volts which is the point at which fast charging is terminated. At the end of the fast charge cycle, the battery is given a top off charge for a pre-determined timed interval and then reverts to a trickle charge which is maintained until the battery is removed from the charger. All of these control functions are provided by a the control signal from the charge control output $C_C$ of the BQ 2002 which is used to start or stop the self-oscillating IR 2151 driver IC.

The overall efficiency of this charger is high enough to obviate the need for any heat sink when charging the battery in a typical lap top computer even though a fully discharged battery can be recharged in about one hour. The charger is also capable of recharging partially discharged batteries without overcharging or otherwise damaging the battery. Also because of the low parts count, the charger can be built as a plug in a wall mount style unit.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A power converter circuit, comprising:
   a DC bus;
   a half bridge transistor circuit coupled across the DC bus, the half bridge transistor circuit including a high-side transistor and a low-side transistor and producing an output pulse width modulation (PWM) signal therebetween;
   a self oscillating half bridge driver circuit for producing first and second control PWM signals in response to an external threshold signal, the first control PWM signal coupled to a control terminal of the high-side transistor and the second control PWM signal coupled to a control terminal of the low-side transistor;
   a low pass filter for receiving the output PWM signal and producing a DC output voltage in response thereto across a pair of output terminals; and
   a programmable voltage regulating device having an input terminal coupled to the DC output voltage and an output terminal coupled to the external threshold voltage.

2. The power converter circuit of claim 1, wherein the output terminals are capable of sourcing and sinking current to a load.

3. The power converter circuit of claim 1, wherein the DC output voltage is capable of remaining in regulation at zero load.

4. The power converter circuit of claim 1, wherein the low pass filter comprises an inductor and a capacitor in series connection, the DC output voltage being taken across the capacitor.

5. The power converter circuit of claim 4, wherein the inductor includes a first inductor connected between the output PWM signal and one terminal of the capacitor and a second inductor, linked to the first inductor, for producing a floating DC output voltage.

6. The power converter circuit of claim 5, further comprising a rectifying diode and a second capacitor coupled in series across the second inductor wherein the floating DC output voltage is taken across the second capacitor.

7. The power converter circuit of claim 5, wherein the DC output voltage and the floating DC output voltage are capable of remaining in regulation at zero load.

8. The power converter circuit of claim 1, further comprising a voltage divider circuit coupled between the output terminals for producing a sensed voltage for input to the input terminal of the programmable voltage regulating device.

9. The power converter circuit of claim 1, wherein the programmable voltage regulating device is a three terminal shunt regulator.

10. The power converter circuit of claim 9, wherein the three terminal shunt regulator functions as a programmable zener diode.

11. The power converter circuit of claim 1, wherein the transistors are MOS gated transistors.

12. The power converter circuit of claim 1, wherein the self oscillating half bridge driver circuit is disposed in an integrated circuit.

13. The power converter circuit of claim 12, wherein the self oscillating half bridge driver circuit is an IR 2151 half bridge driver.

14. The power converter circuit of claim 12, wherein the half bridge transistor circuit is also disposed in the integrated circuit.

15. The power converter circuit of claim 14, wherein the integrated circuit is of the IR51HXXX series.

16. A power converter circuit, comprising:
   a DC bus;
   a half bridge transistor circuit coupled across the DC bus, the half bridge transistor circuit including a high-side transistor and a low-side transistor and producing an output pulse width modulation (PWM) signal therebetween;
   a self oscillating half bridge driver circuit for producing first and second control PWM signals in response to an external threshold signal, the first control PWM signal coupled to a control terminal of the high-side transistor and the second control PWM signal coupled to a control terminal of the low-side transistor;
   a low pass filter for receiving the output PWM signal and producing a DC output current in response thereto from a pair of output terminals;
   a current sensing device for monitoring the DC output current and producing a voltage analog thereof; and
   a programmable voltage regulating device having an input terminal coupled to the voltage analog of the DC output current and an output terminal coupled to the external threshold voltage.

17. The power converter circuit of claim 16, wherein the current sensing device is a shunt resistor disposed in series with the output filter, the voltage analog of the DC output current being taken across the shunt resistor.

18. The power converter circuit of claim 17, further comprising a potentiometer coupled across the shunt resistor for adjusting the voltage analog of the DC output current.

19. The power converter circuit of claim 16, wherein the low pass filter comprises an inductor and a capacitor in series connection, the DC output current being taken from the junction of the inductor and the capacitor.

20. The power converter circuit of claim 16, wherein the programmable voltage regulating device is a three terminal shunt regulator.

21. The power converter circuit of claim 20, wherein the three terminal shunt regulator functions as a programmable zener diode.

22. The power converter circuit of claim 16, wherein the transistors are MOS gated transistors.

23. The power converter circuit of claim 16, wherein the self oscillating half bridge driver circuit is disposed in an integrated circuit.

24. The power converter circuit of claim 23, wherein the self oscillating half bridge driver circuit is an IR 2151 half bridge driver.

25. The power converter circuit of claim 23, wherein the half bridge transistor circuit is also disposed in the integrated circuit.

26. The power converter circuit of claim 25, wherein the integrated circuit is of the IR51HXXX series.

27. The power converter circuit of claim 16, wherein N battery cells having a terminal voltage thereacross are coupled across the output terminals of the power converter, the power converter further comprising a battery management control circuit having an input coupled to the terminal voltage and an output control signal coupled to the external threshold voltage, the battery management control circuit adjusting the DC output current in accordance with a predetermined battery charging cycle via the output control signal.

28. The power converter circuit of claim 27, wherein the output control signal is coupled to the external threshold voltage via a level shifting circuit.

29. The power converter circuit of claim 28, wherein the level shifting circuit includes at least one diode.

30. The power converter circuit of claim 16, wherein the predetermined charge cycle of the battery management control circuit includes at least one of a rapid charging period, a top off charging period, and a trickle charging period.

31. The power converter circuit of claim 30, wherein the rapid charging period is terminated upon detection of a peak voltage termination at which time the top off charging period begins.

32. The power converter circuit of claim 31, wherein the output control signal is of the on/off type and a duty cycle thereof permits the self oscillating driver circuit and bridge transistor circuit to deliver current to the N battery cells for about 286 $\mu$s and prohibits the self oscillating driver circuit and bridge transistor circuit from delivering current to the N battery cells for about 4.6 ms during the top off charging period.

33. The power converter circuit of claim 30, wherein the output control signal is of the on/off type and a duty cycle thereof permits the self oscillating driver circuit and bridge transistor circuit to deliver current to the N battery cells for about 286 $\mu$s and prohibits the self oscillating driver circuit and bridge transistor circuit from delivering current to the N battery cells for about 18.3 ms during the trickle charging period.

* * * * *